(12) United States Patent
Clough

(10) Patent No.: US 7,108,329 B1
(45) Date of Patent: Sep. 19, 2006

(54) SEATING UNIT WITH RETRACTABLE FOOTREST

(76) Inventor: Robert Clough, 26841 Reuther Ave., F, Santa Clarita, CA (US) 91351

( * ) Notice: Subject to any disclaimer, the term of this patent is extended or adjusted under 35 U.S.C. 154(b) by 0 days.

(21) Appl. No.: 11/280,042

(22) Filed: Nov. 15, 2005

(51) Int. Cl.
*A47C 7/50* (2006.01)

(52) U.S. Cl. .................................................. 297/423.19

(58) Field of Classification Search ............ 297/423.1, 297/423.15, 423.14, 423.19, 423.26; 244/122 R
See application file for complete search history.

(56) References Cited

U.S. PATENT DOCUMENTS

| | | | | |
|---|---|---|---|---|
| 2,481,970 A | * | 9/1949 | Bell | 297/423.15 |
| 2,602,490 A | * | 7/1952 | Earl | 297/423.15 |
| 2,608,242 A | * | 8/1952 | Owler | 297/423.15 |
| 3,856,352 A | * | 12/1974 | Jacobi, Sr. | 297/423.15 |
| 3,936,093 A | * | 2/1976 | Hogan | 297/423.15 |

* cited by examiner

*Primary Examiner*—Milton Nelson, Jr.
(74) *Attorney, Agent, or Firm*—James E. Brunton, Esq.

(57) ABSTRACT

An extendable, retractable footrest assembly for use in combination with a seat having a backrest portion and a seat portion having an upper surface and a lower surface. The footrest assembly is disposed proximate the lower surface of the seat portion and is readily movable from a first stowed position beneath upper surface of the seat portion to a second deployed position.

The foot support assembly includes a subassembly that comprises a pair of side support members that support a pivotally movable footrest that is movable from a stowed position between the side support members to a deployed position wherein it extends forwardly of the side support members.

15 Claims, 6 Drawing Sheets

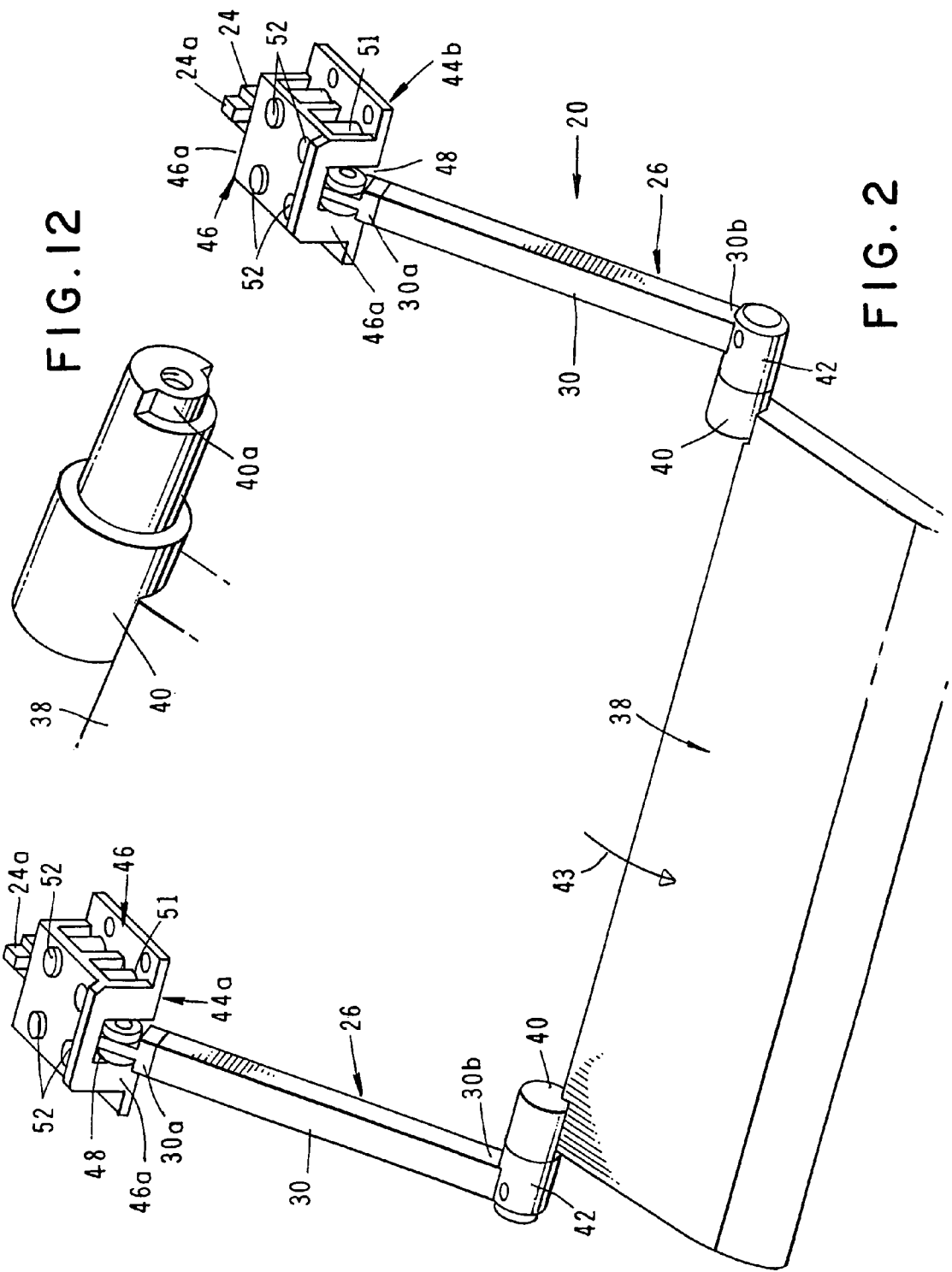

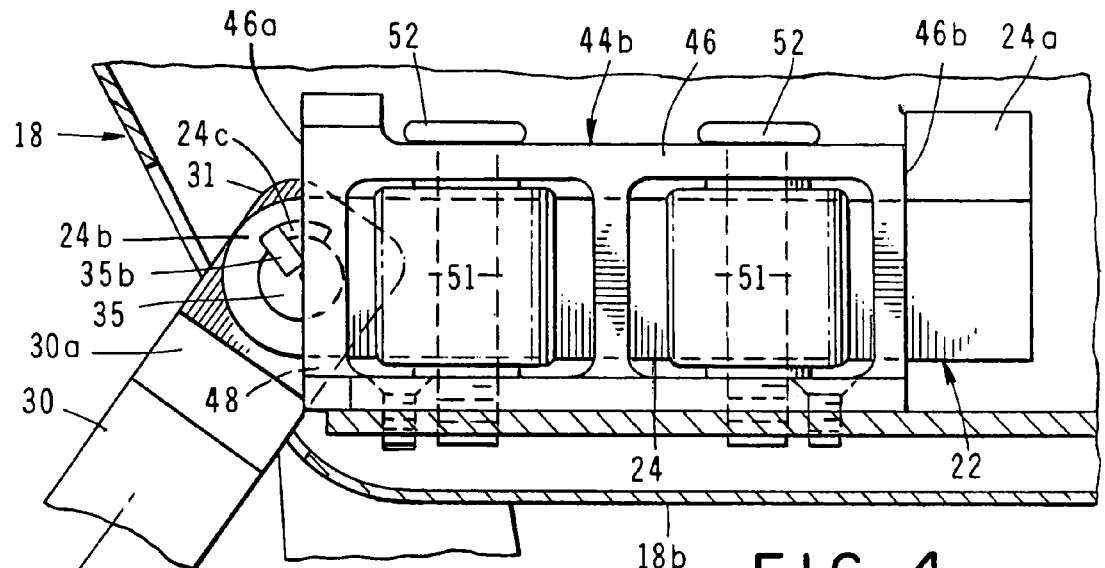
FIG. 4
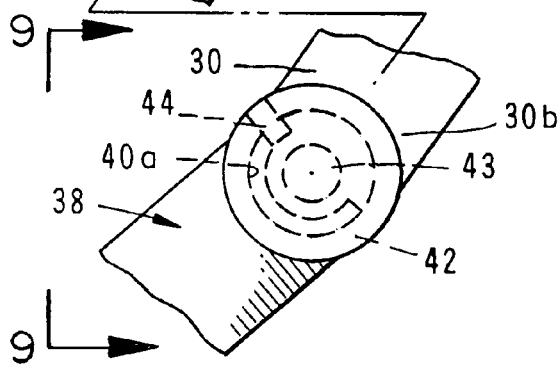
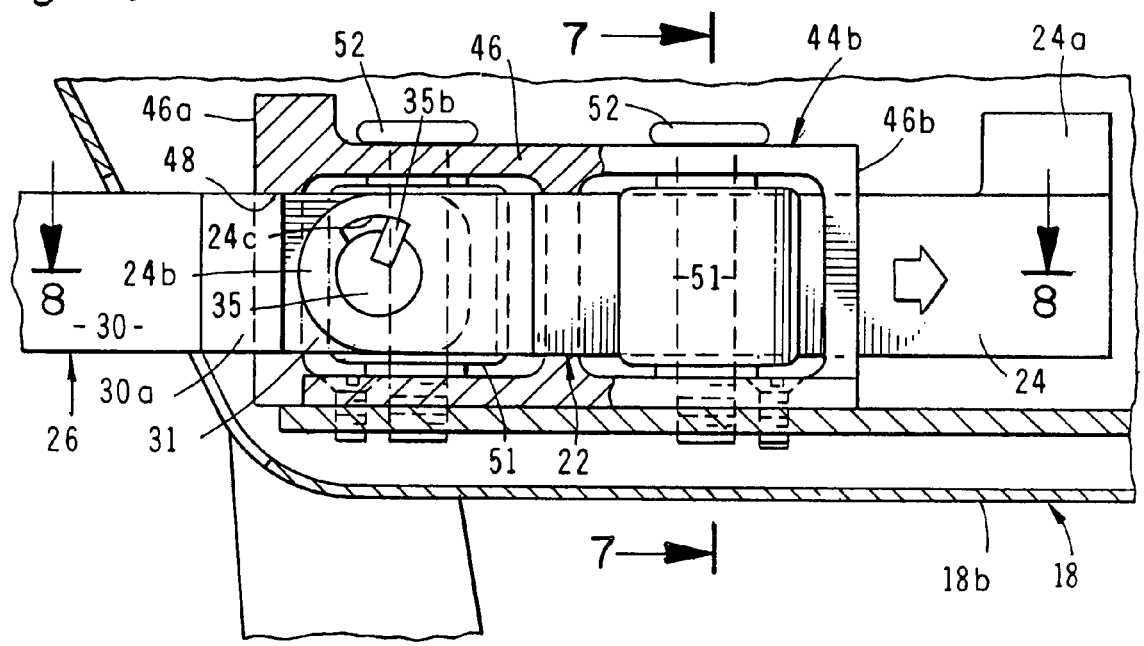
FIG. 5

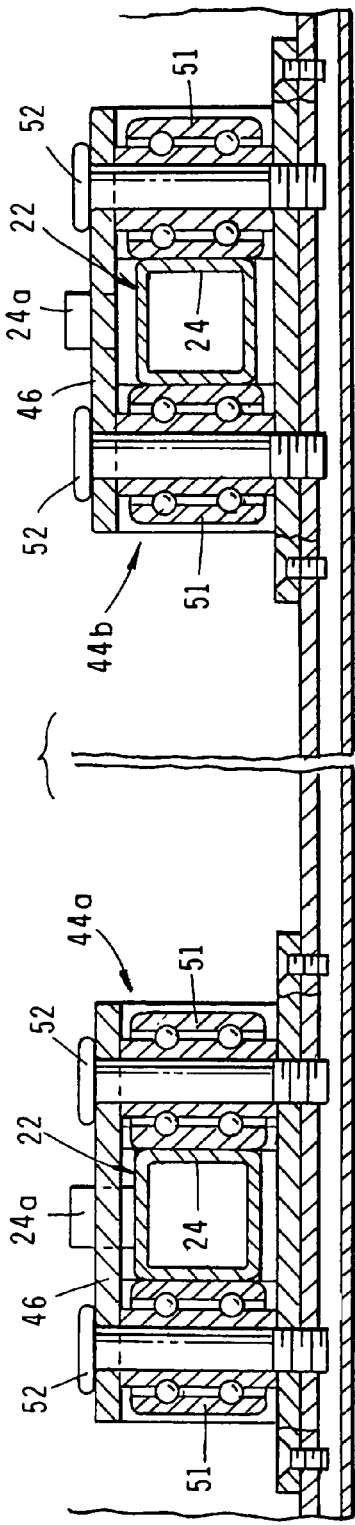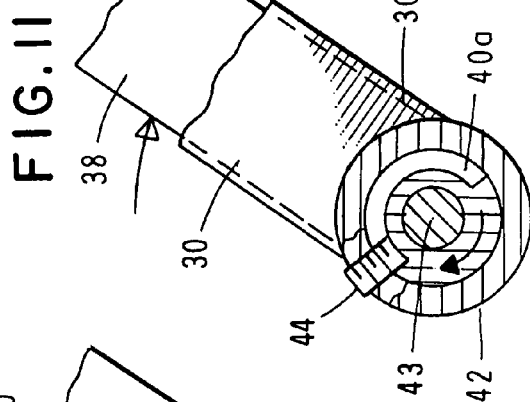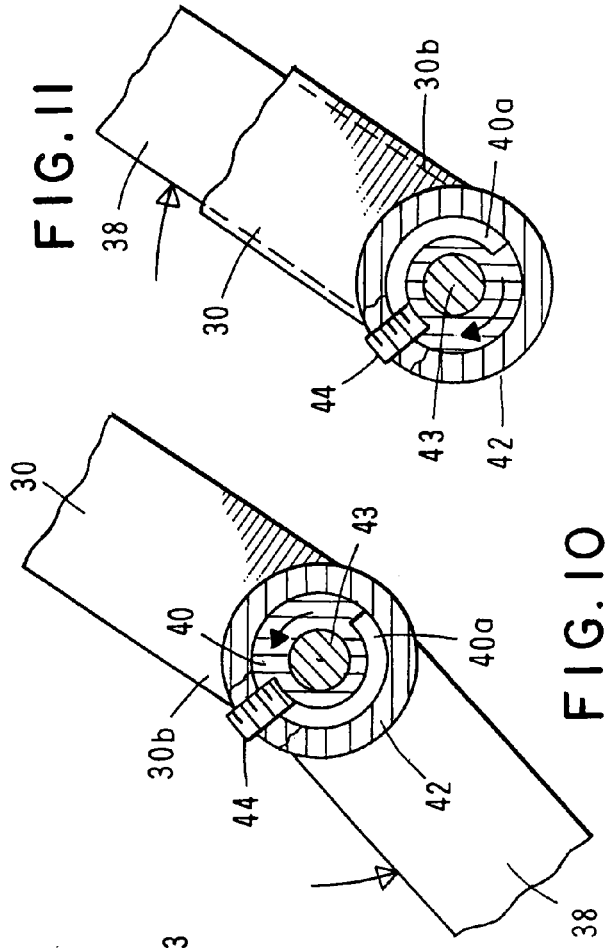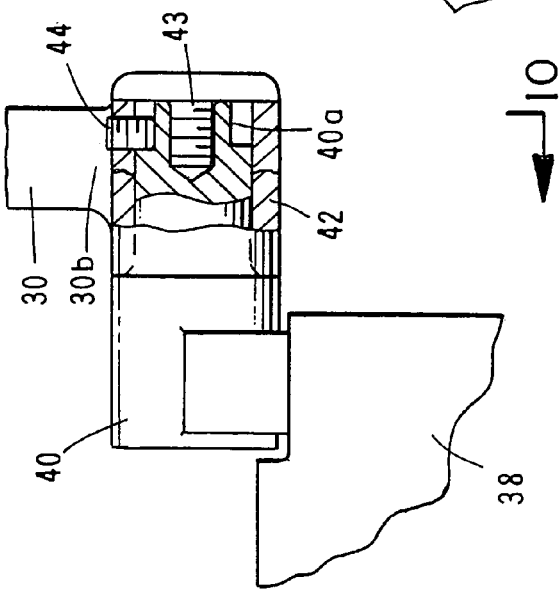
FIG. 7
FIG. 9
FIG. 10
FIG. 11

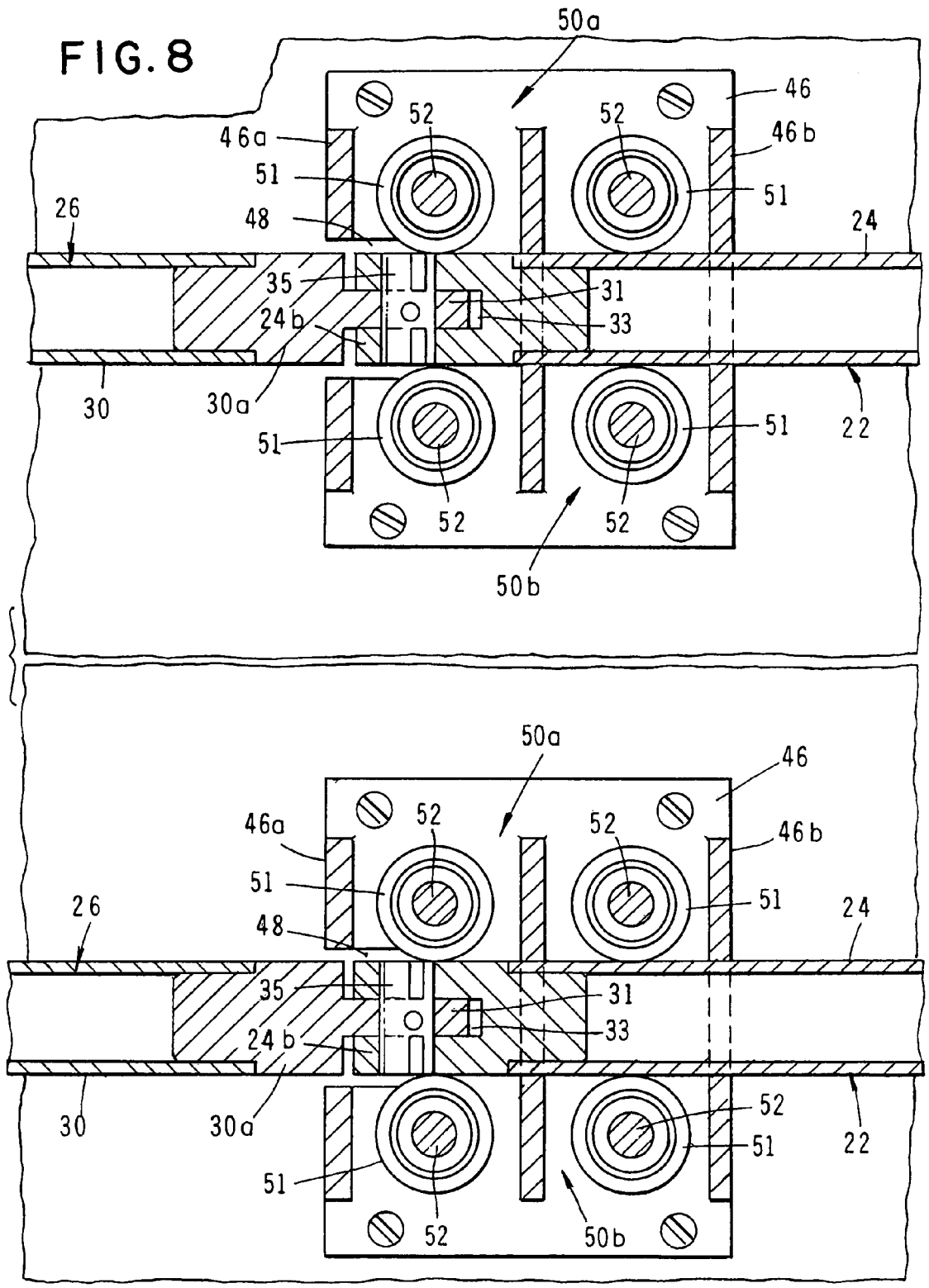

SEATING UNIT WITH RETRACTABLE FOOTREST

BACKGROUND OF THE INVENTION

1. Field of the Invention

The present invention relates generally to seating. More particularly, the invention concerns a vehicle seating unit embodying a novel, retractable foot support assembly.

2. Discussion of the Prior Art

Various types of footrest mechanisms for use with seating units have been suggested in the past. In many types of prior art footrest constructions, the footrest mechanisms is pivotally connected to the front portion of the chair frame and is pivotally movable from a generally vertical orientation proximate the front of the seat into a generally horizontal orientation. Often the prior art footrest mechanisms include an inner extendable supporting member that is strategically positioned to support the rear portions of the user's legs and further comprise an outer supporting member for supporting the user's feet. In many prior art constructions the outer supporting member is pivotally movable from a retracted stowed position to an extended deployed position.

In prior art footrest mechanisms that are adapted to be used with transport vehicles such as trains, buses and airplanes, the footrest mechanism is pivotally connected to the seating unit that is disposed forwardly of the seating unit upon which the passenger is seated. In such constructions, the footrest mechanism pivots from a stowed position proximate the back of the forward seating unit to a lowered, extended or deployed position.

When the footrest mechanism is used in connection with aircraft, space considerations become extremely important. Since the distance between the rows of aircraft seats is of necessity limited, footrest mechanisms that are interconnected with the back of the forward seat are undesirable because they occupy the valuable space between the rows of seats. It is this problem that the present invention seeks to address by providing a novel footrest mechanism that is stowed beneath the seat cushion and is movable forwardly from the stowed position into the deployed position, thereby conserving the valuable space between the rows of aircraft seats.

SUMMARY OF THE INVENTION

By way of summary, the present invention concerns an extendable, retractable footrest assembly for use in combination with a seat having a backrest portion and a seat portion having an upper surface and a lower surface. The footrest assembly is disposed proximate the lower surface of the seat portion and is readily movable from a first stowed position beneath upper surface of the seat portion to a second deployed position.

With the forgoing in mind, it is an object of the present invention to provide a novel vehicle seating unit that embodies a foot support assembly of simple construction that is slidably movable from a stowed position beneath the seat to a deployed position wherein a portion of the foot support assembly extends outwardly, downwardly and rearwardly of the seat.

Another object of the invention is to provide a vehicle seating unit of the aforementioned character in which the foot support assembly includes a subassembly that comprises a pair of side support members that support a pivotally movable footrest, the subassembly being positioned so as to automatically pivot downwardly as the foot support assembly is moved into its deployed position.

Another object of the invention is to provide a vehicle seat unit of the character described in the preceding paragraph in which the pivotally movable foot support is movable from a stowed position between the side support members to a deployed position wherein it extends forwardly of the side support members.

Another object of the invention is to provide a vehicle seat unit of the class described in which the foot support assembly includes novel guide means disposed beneath the seat of the seat unit for guiding the travel of the side members as the foot support assembly that is moved from its stowed position beneath the seat of the seating unit into its deployed position.

BRIEF DESCRIPTION OF THE DRAWINGS

FIG. 2 is a generally perspective view of one form of the footrest assembly of the invention showing the footrest portion of the assembly in a deployed configuration.

FIG. 4 is a greatly enlarged, fragmentary view, partly in cross-section of the area identified in FIG. 1 by the numerals 4—4 better illustrating the construction of one form of the guide means of the invention for guiding travel of the side members of the footrest assembly.

FIG. 5 is a fragmentary view similar to FIG. 4, but showing the footrest subassembly moved into an elevated configuration prior to its being stowed beneath the seat of the seating unit.

FIG. 7 is a cross-sectional view taken along lines 7—7 of FIG. 5.

FIG. 8 is a cross-sectional view taken along lines 8—8 of FIG. 5.

FIG. 9 is a view, partly in cross section, taken along lines 9—9 of FIG. 4.

FIG. 10 is a cross-sectional view taken along lines 10—10 of FIG. 9.

FIG. 11 is a view similar to FIG. 10 but showing the footrest moved from a deployed configuration into a stowed configuration.

FIG. 12 is a generally perspective, fragmentary view of the interconnection shaft which interconnects one side of the footrest portion with one of the elongated side members of the footrest subassembly.

DESCRIPTION OF THE INVENTION

Figure 1:
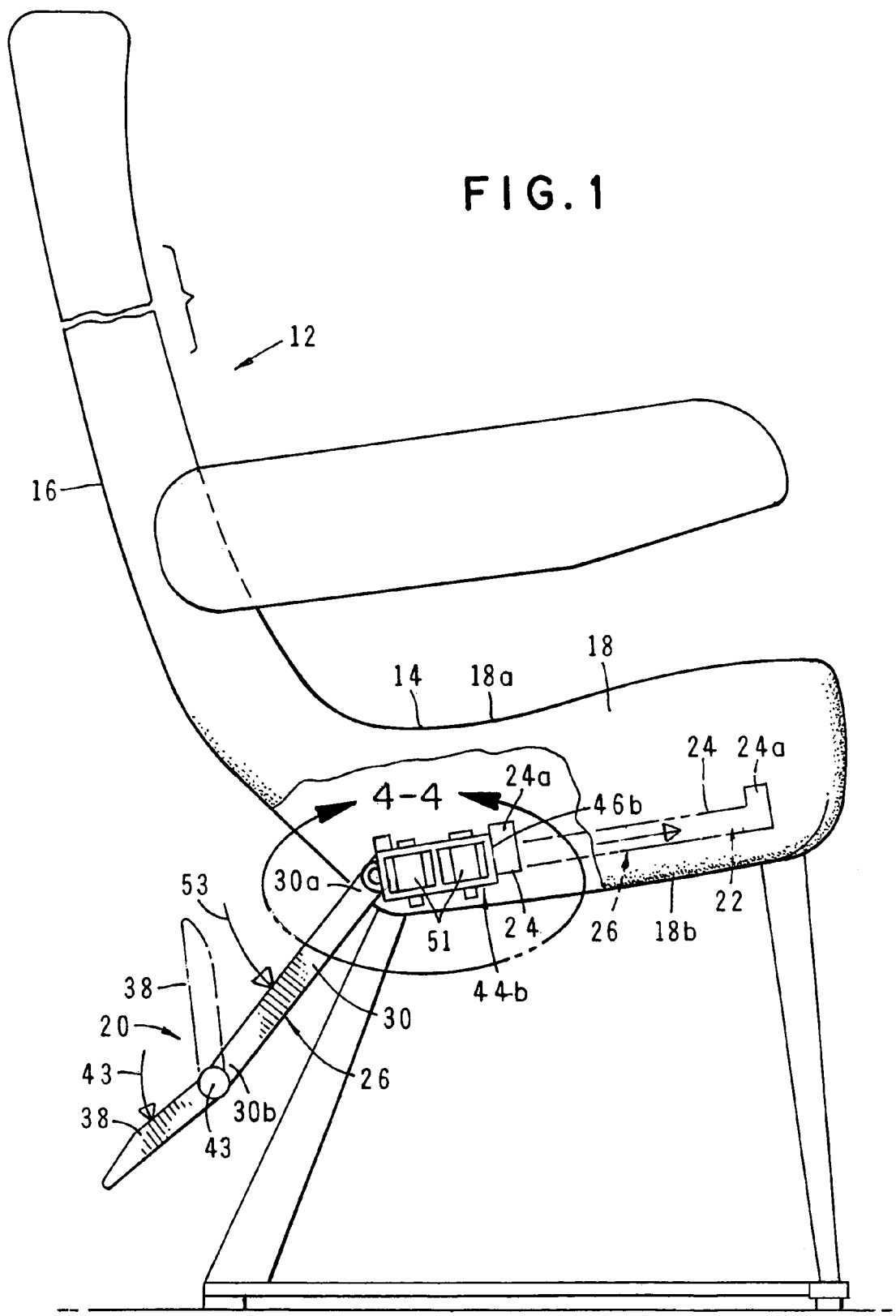
FIG. 1 is a side elevational view of a seating unit showing the footrest assembly of the invention interconnected with the seating unit and moved into a deployed position.
Figure 3:
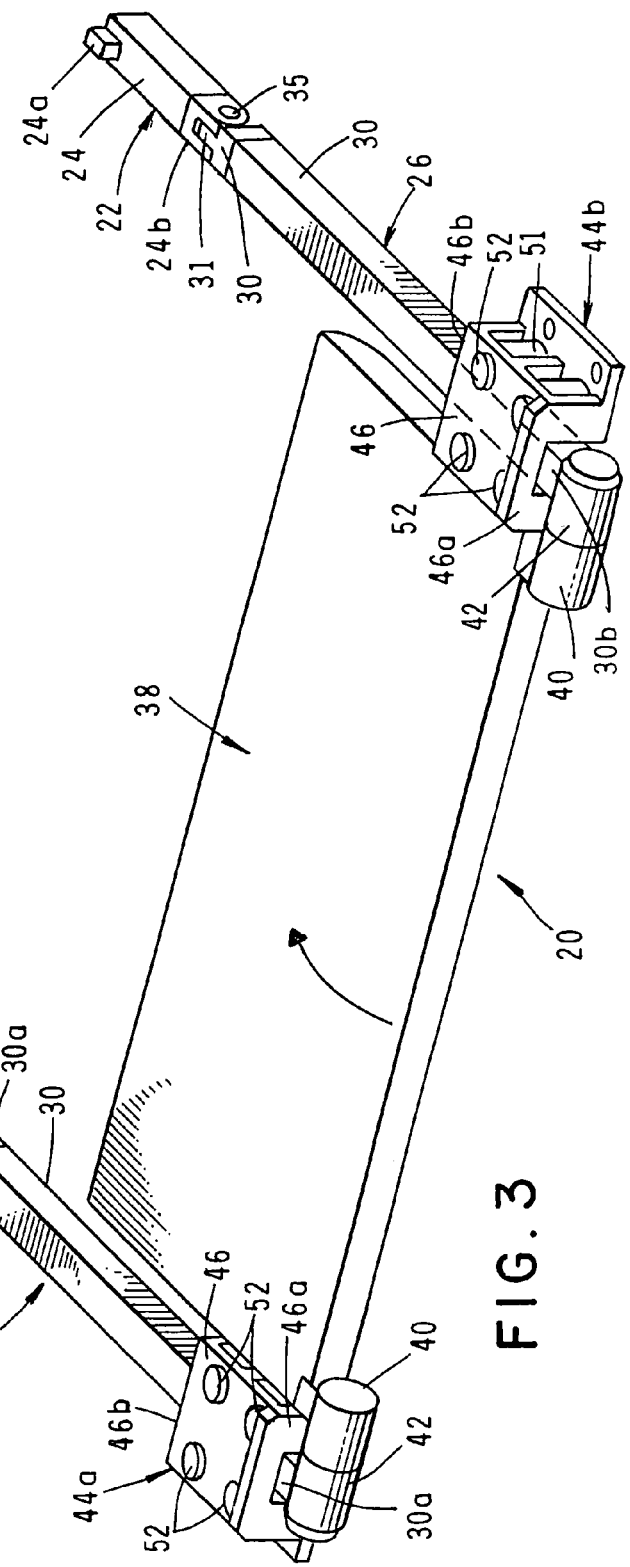
FIG. 3 is a generally perspective view, similar to FIG. 2, but showing the footrest portion of the assembly in a stowed configuration.

Referring to the drawings and particularly in FIGS. 1, 2 and 3, one form of the seating unit 12 of the invention can be seen to comprise a seat 14 having a backrest portion 16 and a seat portion 18 having an upper surface 18a and the lower surface 18b. As illustrated in FIG. 1, the seating unit 12 also includes a footrest assembly 20, which, when not in use, is disposed proximate lower surface 18b of the seat portion 18. As indicated in FIG. 1, footrest assembly 20 is movable relative to said seat portion 18 from the first stowed position shown in the phantom lines to the second deployed position shown in the solid lines. In the present form of the invention the footrest assembly comprises a first subassembly 22, which comprises a pair of transversely spaced-apart first side members 24 that are movable rearwardly relative to seat portion 18 between a first position shown by the phantom lines in FIG. 1 and a second position shown by the solid lines in FIG. 1. Also forming a part of the first subassembly 22 are upstanding stop members 24a that are affixed to the first side, or stub members 24 in the manner best seen in FIG. 3. The purpose of these stop members will presently be described.

Figure 6:
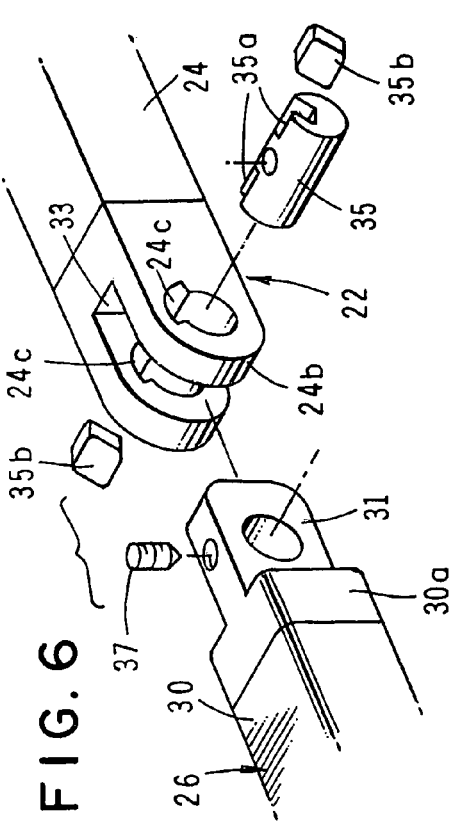
FIG. 6 is a generally perspective, fragmentary, exploded view illustrating the interconnection mechanism for interconnecting the foot support subassembly with the stub side member of the footrest assembly.

Footrest assembly 20 also includes a second subassembly 26, which is operably associated with first subassembly 22, and here comprises a pair of transversely spaced-apart second side members 30. Second side members 30 are also movable relative to the seat portion between a first position shown in the phantom lines in FIG. 1 and a second position shown by the solid lines in FIG. 1. Each of the second side members 30 has first and second extremities 30a and 30b. As indicated in FIGS. 4, 5 and 6 of the drawings, the first extremity of each of the second side members 30 is pivotally connected to the outboard extremity 24b of a selected one of the first side members 24. More particularly, the first extremities 30a each include a tongue 31 which is received within a groove 33 formed in outboard extremities 24b of stub sides 24. Pivot pins 35 along with a set screw 37 function to hold the tongues within the grooves. Each pivot pin has longitudinally spaced-apart slots 35a, which accept keys 35b (FIG. 6). With the construction thus described, when the first side members reach the extended position shown in FIG. 4 of the drawings, subassembly 22 will tend to move by force of gravity into the downward, deployed position shown in FIG. 4. As subassembly 22 pivots downwardly, keys 35b will travel within arcuate slots 24c formed in end portions 24b and will appropriately limit the extent of the downward travel of the subassembly (see FIGS. 2, 4 and 5).

Spanning and pivotally connected to the spaced-apart second side members is a foot support 38. Foot support 38 is pivotally movable between its stowed position intermediate the second side members (FIG. 3) and its extended position shown in FIG. 2 of the drawings. In this regard, as shown in FIGS. 2 and 12, foot support 38 is provided at its margins with pivot pins 40 which are received at width and the sleeves 42 provided at the extremities 30b of elongated side members 30. As indicated in FIG. 9, pivot pins 40 are held in position within sleeves 42 by locking screws 43 and set screws 44. As the foot support is pivoted between its deployed position shown in FIGS. 2 and 10 and its stowed position shown in FIGS. 3 and 11, set screws 44 travel within grooves 40a formed in pins 40 (FIG. 12) so as to appropriately limit the travel of the foot support in the manner illustrated in FIGS. 10 and 11.

Also forming an important part of the seating unit 12 are novel guide means which are connected to seat 18. These important guide means are operably associated with second side members 30 and function to guide the travel thereof between the first position shown in the phantom lines of FIG. 1 and the second position shown in the solid lines in FIG. 1. In the present form of the invention these important guide means comprise first and second transversely spaced-apart roller assemblies that are generally designated by the numerals 44a and 44b (FIG. 7). Roller assemblies 44a and 44b are preferably connected to seat 18 and each comprises a housing 46 having an opening 48 formed in the forward wall 46a thereof. As indicated in FIGS. 2 and 5 of the drawings, second sides 30 are telescopically received within the openings 48 in the housings 46 for movement between the deployed position shown in FIG. 2 and the stowed position shown by the phantom lines in FIG. 1.

First and second sides 24 and 30 of the footrest assembly are closely received between spaced-apart pairs of rollers 50a and 50b (FIG. 8). Each of the rollers 51 of the spaced-apart pairs of rollers are held in position within housing 46 by a threaded stem 52 and function to precisely guide the travel of the sides between their stowed position and their deployed position.

In operating the footrest assembly of the invention, with the footrest assembly in its stowed position, the exertion of an outwardly directed force will cause the footrest assembly to move rearwardly of the seating unit. When the assembly reaches the position shown by the solid lines of FIG. 1 of the drawings, stop members 24a will engage the rear edge 46b of housings 46 stopping the outward movement of the footrest assembly. When the footrest assembly reaches the position shown by the solid lines in FIG. 1, second subassembly 22 will automatically move by force of gravity downwardly into its deployed position as indicated by the arrow 53. With the second subassembly 22 of the footrest assembly in its deployed position, footrest 38 can be pivotally moved in the direction of arrow 43 of FIG. 1 from its stowed position shown by the phantom lines into its deployed position shown by the solid lines.

When it is desired to return the footrest assembly to its stowed position, footrest 38 is first moved from the deployed position shown in the solid lines of FIG. 1 into the stowed position shown in FIG. 3. This done the second subassembly 22 can be lifted into a substantially horizontal position shown in FIG. 5 and then urged forwardly into the seat 18 of the seating unit. As the foot assembly is urged toward its stowed position, travel of the second sides 26 and 30 into the lower seat cushion will be smoothly guided by the guide means, or roller assemblies 50a and 50b of the invention.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In combination with a seat having a backrest portion and a seat portion having an upper surface and a lower surface, an extendable, retractable footrest assembly disposed proximate the lower surface of the seat portion and being movable from a first stowed position to a second deployed position, said footrest assembly comprising:
    (a) a pair of transversely spaced-apart side members movable relative to the seat portion between a first position and a second position;
    (b) a foot support connected to said spaced-apart side members; and
    (c) guide means connected to the seat and operably associated with said spaced-apart side members for guiding travel of said side members between said first and second positions, said guide means comprising first and second transversely spaced-apart rollers connected to said seat for rollable engagement with said side members to guide the travel thereof between said first and second positions.

2. The combination as defined in claim 1 in which said foot support is pivotally interconnected with said side members for movement between a stowed position intermediate said side members and an extended position.

3. The combination as defined in claim 1 in which each of said side members includes an elongated portion and a stub portion pivotally interconnected with said elongated portion.

4. The combination as defined in claim 3 in which said stub portion includes a stop member for engagement with a housing of said roller assembly to maintain said stub portion interiorly of said housing when said footrest assembly is in the deployed position.

5. The combination as defined in claim 4 in which each said roller assembly includes a second pair of rollers rotatably mounted within said housing and transversely spaced from said first pair of rollers.

6. In combination with a seat having a backrest portion and a seat portion having an upper surface and a lower surface, an extendable, retractable footrest assembly disposed proximate the lower surface of the seat portion and being movable from a first stowed position to a second deployed position, said footrest assembly comprising:
  (a) a pair of transversely spaced-apart side members movable relative to the seat portion between a first position and a second position;
  (b) a foot support connected to said spaced-apart side members; and
  (c) guide means connected to the seat and operably associated with said spaced-apart side members for guiding travel of said side members between said first and second positions, said guide means comprise first and second transversely spaced-apart roller assemblies connected to said seat, each said roller assembly comprising:
    (i) a housing having an opening for telescopically receiving a selected one of said side members; and
    (ii) a first pair of rollers rotatably mounted within said housing for engagement with said selected one of said side members.

7. An aircraft passenger seating unit comprising:
  (a) a backrest portion;
  (b) a seat portion having an upper surface and a lower surface; and
  (c) an extendable, retractable footrest assembly disposed proximate said lower surface of said seat portion, said footrest assembly being movable relative to said seat portion from a first stowed position to a second deployed position, said footrest assembly comprising:
    (i) a pair of transversely spaced-apart side members movable relative to the seat portion between a first position and a second position;
    (ii) a foot support pivotally connected to said spaced-apart side members for movement between a stowed position intermediate said side members and an extended position; and
    (iii) guide means connected to the seat and operably associated with said spaced-apart side members for guiding travel of said side members between said first and second positions, said guide means comprising first and second transversely spaced rollers connected to said seat for engagement with said side members.

8. An aircraft passenger seating unit comprising:
  (a) a backrest portion;
  (b) a seat portion having an upper surface and a lower surface; and
  (c) an extendable, retractable footrest assembly disposed proximate said lower surface of said seat portion, said footrest assembly being movable relative to said seat portion from a first stowed position to a second deployed position, said footrest assembly comprising:
    (i) a pair of transversely spaced-apart side members movable relative to the seat portion between a first position and a second position, each of said side members having an elongated portion and a stub portion pivotally interconnected with said elongated portion;
    (ii) a foot support pivotally connected to said spaced-apart side members for movement between a stowed position intermediate said side members and an extended position; and
    (iii) guide means connected to the seat portion and operably associated with said spaced-apart side members for guiding travel of said side members between said first and second positions, said guide means comprising first and second transversely spaced-apart or roller assemblies connected to said seat portion, each said roller assembly comprising:
      a. a housing having an opening for telescopically receiving a selected one of said side members; and
      b. first and second transversely spaced-apart rollers rotatably mounted within said housing for engagement with said selected one of said side members.

9. The combination as defined in claim 8 in which said seating unit portion of said aircraft passenger seat has a front and a back and in which each of said housings of said guide means is connected to said seat portion proximate said back thereof.

10. The combination as defined in claim 8 in which each of said side members includes an elongated portion and a stub portion pivotally interconnected with said elongated portion.

11. The combination as defined in claim 10 in which said stub portion includes a stop member for engagement with said housing of said roller assembly to maintain said stub portion interiorly of said housing when said footrest assembly is in the deployed position.

12. An aircraft passenger seating unit comprising:
  (a) a backrest portion;
  (b) a seat portion having an upper surface and a lower surface; and
  (c) a footrest assembly disposed proximate said lower surface of said seat portion, said footrest assembly being movable relative to said seat portion from a first position to a second position, said footrest assembly comprising:
    (i) a first subassembly comprising a pair of transversely spaced-apart first side members movable relative to the seat portion between a first position and a second position;
    (ii) a second subassembly operably associated with said first subassembly, comprising:
      a. a pair of transversely spaced-apart second side members movable relative to the seat portion between a first position and a second position, each of said second side members having first and second extremities, said first extremity thereof being pivotally connected to said transversely spaced-apart first side members;
      b. a foot support pivotally connected to said spaced-apart second side members for movement between a stowed position intermediate said second side members and an extended position; and (iii) guide means connected to the seat and operably associated with said second side members for guiding travel thereof between said first and second positions, said guide means comprising first and second transversely spaced-apart roller assemblies connected to said seat.

13. The combination as defined in claim 12 each said roller assembly comprises:
   (a) a housing having an opening for telescopically receiving a selected one of said side members; and
   (b) first and second transversely spaced-apart rollers rotatably mounted within said housing for engagement with said selected one of said side members.

14. The combination as defined in claim 13 in which said aircraft passenger seating unit has a front and a back and in which each of said housings of said guide means is connected to said seat portion proximate said back thereof.

15. The combination as defined in claim 14 in which each of said first pair of transversely spaced-apart first side members includes a stop member for engagement with said housing of said roller assembly to maintain said first side members interiorly of said housing when said footrest assembly is in the second position.

* * * * *